United States Patent
Nishioka

(10) Patent No.: US 9,343,090 B1
(45) Date of Patent: May 17, 2016

(54) MAGNETORESISTIVE SENSOR HAVING AN IR SEED LAYER FOR IMPROVED PINNED LAYER ROBUSTNESS

(71) Applicant: HGST Netherlands B.V., Amsterdam (NL)

(72) Inventor: Kouichi Nishioka, Hiratsuka (JP)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/718,018

(22) Filed: May 20, 2015

(51) Int. Cl.
   *G11B 5/33* (2006.01)

(52) U.S. Cl.
   CPC .................................... *G11B 5/33* (2013.01)

(58) Field of Classification Search
   CPC ............. G11B 5/39; G11B 5/33; G11B 5/127
   USPC .......... 360/324.12, 324.11, 324.1, 324.2, 324
   See application file for complete search history.

(56) References Cited

U.S. PATENT DOCUMENTS

| | | | |
|---|---|---|---|
| 7,646,568 B2 | 1/2010 | Zhang et al. | |
| 8,068,315 B2 | 11/2011 | Freitag et al. | |
| 8,164,862 B2 | 4/2012 | Zhang et al. | |
| 8,218,270 B1* | 7/2012 | Zeltser et al. | 360/324.12 |
| 8,570,691 B2 | 10/2013 | Sato et al. | |
| 8,670,218 B1* | 3/2014 | Zeltser et al. | 360/324.2 |
| 8,675,317 B2 | 3/2014 | Lin | |
| 2001/0043986 A1* | 11/2001 | Saito et al. | 427/130 |
| 2001/0053053 A1* | 12/2001 | Saito et al. | 360/324.11 |
| 2003/0072111 A1* | 4/2003 | Hasegawa et al. | 360/324.12 |
| 2006/0024939 A1* | 2/2006 | Grunow et al. | 438/596 |
| 2009/0091865 A1* | 4/2009 | Zhang | H01F 10/3268 360/324.12 |
| 2009/0168267 A1* | 7/2009 | Lin | 360/324.2 |
| 2010/0155232 A1* | 6/2010 | Pentek | G11B 5/1278 204/192.34 |
| 2011/0151278 A1* | 6/2011 | Gurney | G11B 5/3106 428/800 |
| 2011/0163449 A1* | 7/2011 | Kelly et al. | 257/750 |
| 2011/0236723 A1* | 9/2011 | Lin | 428/811.2 |
| 2012/0050915 A1* | 3/2012 | Hong | G11B 5/1278 360/123.12 |
| 2012/0156390 A1* | 6/2012 | Araki | G01R 33/098 427/534 |
| 2013/0069041 A1* | 3/2013 | Zhu et al. | 257/29 |
| 2014/0183673 A1 | 7/2014 | Zhang et al. | |
| 2014/0210022 A1 | 7/2014 | Quan et al. | |
| 2014/0210024 A1* | 7/2014 | Lin | H01L 43/12 257/421 |
| 2014/0334031 A1 | 11/2014 | Nishioka et al. | |
| 2014/0334032 A1 | 11/2014 | Nishioka et al. | |
| 2015/0206550 A1* | 7/2015 | Freitag | G11B 5/6082 216/22 |

OTHER PUBLICATIONS

Lin et al., "A tunneling magnetoresistance sensor overlaid with a longitudinal bias stack," Journal of Magnetism and Magnetic Materials, vol. 262, Jun. 2003, pp. 346-351.
Nagamine et al., "Ultralow resistance-area product of 0.4?(?m)2 and high magnetoresistance above 50% in CoFeB?MgO?CoFeB magnetic tunnel junctions," Applied Physics Letters, vol. 89, Oct. 17, 2006, pp. 162507-1-162507-3.

* cited by examiner

*Primary Examiner* — Allen T Cao
(74) *Attorney, Agent, or Firm* — Zilka-Kotab, PC

(57) ABSTRACT

A magnetic sensor having an Ir seed layer for improved pinning robustness and improved sensor performance. The sensor includes an Ir seed layer formed directly beneath and in contact with a layer of antiferromagnetic material (AFM). The Ir seed layer improves the grain structure and smoothness of the above applied layers to significantly improve the performance and pinning robustness of the sensor. The use of the Ir seed layer reduces interlayer magnetic coupling of the layers, reduces surface roughness and increases the temperature at which the pinned layer looses it's pinning (i.e. raises the mean blocking temperature Tc of the pinned layer structure).

20 Claims, 13 Drawing Sheets

FIG. 13

| Material | w/o Ru or Ir | Ru20A | Ir25A | Ru15/Ir20A |
|---|---|---|---|---|
| CoFe | 1.2059 | 1.098 | 0.8602 | 0.987 |
| MnIr | 0.8926 | 0.6318 | 0.3361 | 0.5542 |
| Ir | - | - | 0.3671 | 0.3978 |
| Ru | 0.407 | 0.3774 | - | 0.3975 |
| NiFe | 0.407 | 0.4837 | 0.4993 | 0.4869 |
| Ta | 1.4045 | 1.2849 | 1.212 | 1.7292 |
| Sub | 0.2811 | 0.2428 | 0.2595 | 0.2686 |

MAGNETORESISTIVE SENSOR HAVING AN IR SEED LAYER FOR IMPROVED PINNED LAYER ROBUSTNESS

FIELD OF THE INVENTION

The present invention relates to magnetic data recording and more particularly to a magnetic read sensor having an Ir seed layer beneath an antiferromagnetic layer of a pinned layer structure for improved pinned layer pinning.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected data tracks on the rotating disk. The read and write heads are located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

As magnetic sensors become smaller in order to accommodate increased data density requirements, various sensor performance characteristics become difficult to maintain. For example, at a very small sensor sizes it is difficult to ensure that the pinned layer will remain sufficiently pinned at elevated temperatures. Heat spikes, such as from head disk contact can temporarily cause the pinned layer to become unpinned, leading to catastrophic failure of the magnetic sensor. In addition, smaller sensors exhibit increased magnetic fluctuations in the pinned layer and the free layer. Smaller sensors require thinner barrier layers, which result in deteriorated free layer magnetic properties as a result of increased interlayer coupling effects. Therefore, there remains a need for a sensor design that can achieve increased magnetic performance, pinned layer and free layer magnetic robustness and reduced free layer magnetic interlayer coupling.

SUMMARY

The present invention provides a magnetic sensor that includes a magnetic free layer structure, a magnetic pinned layer structure and a non-magnetic layer sandwiched between the pinned layer structure and the free layer structure. A layer of antiferromagnetic material is exchange coupled with the magnetic pinned layer structure and a seed layer structure is formed beneath the layer of antiferromagnetic material. The seed layer structure includes a layer of Ir that is in contact with the layer of antiferromagnetic material.

The presence of the Ir seed layer directly beneath the layer of antiferromagnetic material advantageously enhances both the performance of the sensor and the pinning robustness. The Ir seed layer reduces roughness of the above formed layers, thereby reducing interlayer coupling and improving the performance of the sensor as well as increasing the blocking temperature of the pinned layer structure thereby improving pinned layer robustness.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 13 is a table showing surface roughness of various sensor layers for sensors having different various seed layer structures.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
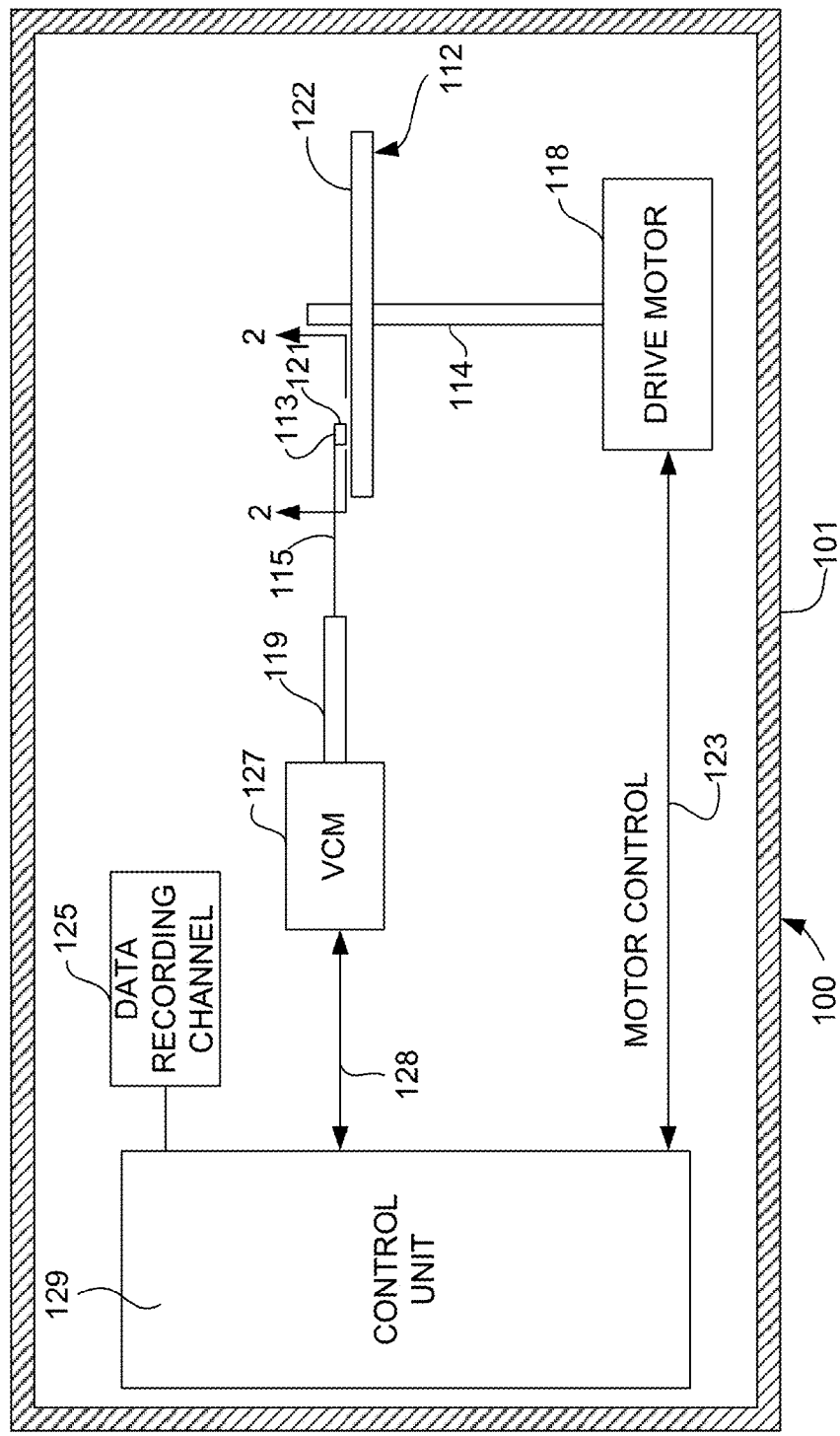
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, data storage and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
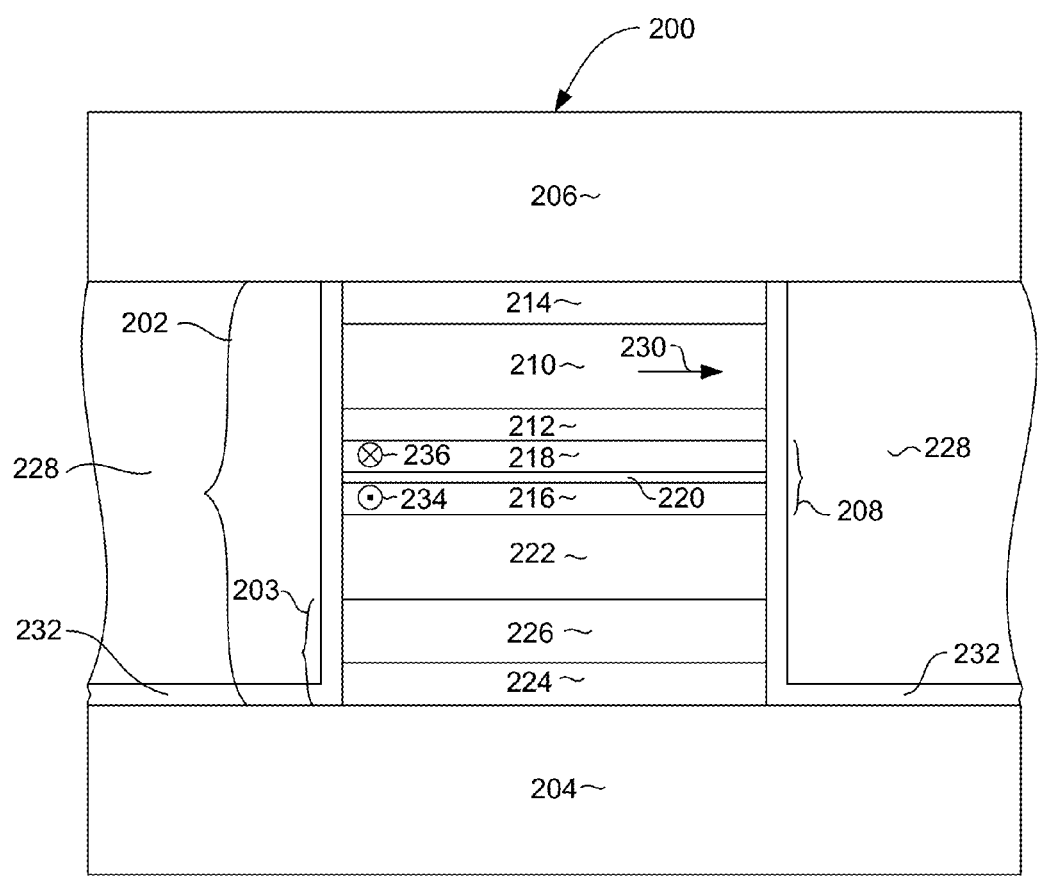
FIG. 2 is a schematic illustration of a magnetic sensor according to an embodiment as seen from the media facing surface.

FIG. 2, is a schematic illustration of a magnetic sensor 200 as seen from the media facing surface. The sensor 200 includes a sensor stack 202 that is sandwiched between first and second magnetic shields 204, 206. The sensor stack includes a magnetic pinned layer structure 208, a magnetic free layer structure 210 and a non-magnetic barrier or spacer layer 212 sandwiched between the magnetic pinned layer structure 208 and magnetic free layer structure 210. A capping layer 214 can be formed at the top of the sensor stack 202 to protect layers such as the free layer 210 during manufacture.

The sensor 200 also includes magnetic bias structures 228 at either side of the sensor stack 202. The magnetic bias structures 228 are constructed of a magnetic material that provides a magnetic bias field for biasing the magnetization of the magnetic free layer 210 in a direction that is generally parallel with the media facing surface as indicated by arrow 230. Each of the magnetic bias structures 228 is separated from the sensor stack 202 and from the bottom shield 204 by a thin, electrically insulating layer 232.

The pinned layer structure 208 can include first and second magnetic layers 216, 218 that are separated from one another by a non-magnetic anti-parallel coupling layer 220 that is sandwiched there-between. The non-magnetic anti-parallel coupling layer 220 can be a material such as Ru and has a thickness that causes the magnetic layers 216, 218 to be strongly magnetically anti-parallel coupled with one another.

The first magnetic layer 216 is exchange coupled with a layer of antiferromagnetic material 222. The layer of antiferromagnetic material 222 can be constructed of IrMn, and is preferably an alloy of Ir and Mn having a face centered cubic (FCC) crystalline structure. More preferably, the layer 222 is L12 $IrMn_3$. The exchange coupling between the first magnetic layer 216 and the layer of antiferromagnetic material 222 causes the magnetization of the first magnetic layer 216 to be strongly pinned in a direction that is generally perpendicular to the media facing surface as indicated by arrow head symbol 234. The exchange coupling between the two magnetic layers 216, 218 causes the magnetization of the second magnetic layer 218 to be strongly pinned in a second direction that is perpendicular to the media facing surface and anti-parallel with the first direction as indicated by arrow tail symbol 236.

The sensor stack 202 also includes a novel seed layer structure 203 that includes a first seed layer 224, and a second seed layer 226 formed on and in direct contact with the first seed layer 224. The second seed layer 226 is formed of Ir and is directly beneath and in contact with the layer of antiferromagnetic material 222. The first seed layer is preferably an amorphous metal, and more preferably can include a Co based amorphous layer and a layer of Ru formed on the Co based amorphous layer.

Figure 3:
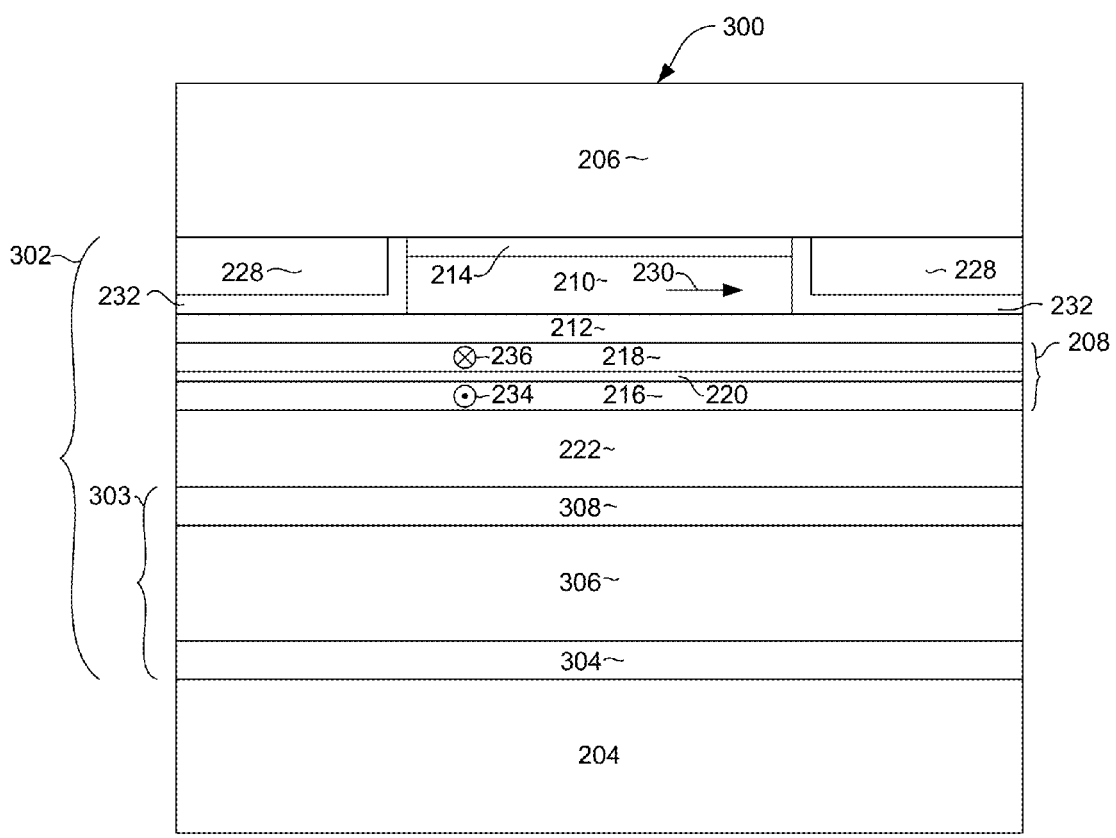
FIG. 3 is a schematic illustration of a magnetic sensor according to an alternate embodiment as seen from the media facing surface.

FIG. 3 shows a view of a magnetic sensor 300 according to another embodiment. This sensor 300 includes a sensor stack 302 having a tri-layer seed layer structure 303 that includes: a first seed layer 304; a second seed layer 306 formed over the first seed layer 304; and a third seed layer 308 formed over the second seed layer 306. The first layer 304 can be formed on a substrate that can be the magnetic shield 204 or could be formed on some intermediate layer there-between. The first seed layer 304 can be constructed of an amorphous metal such as Ta or could include a Co based amorphous layer and a layer of Ru formed there-over. The second seed layer 306 can be a crystalline magnetic material preferably having a face centered cubic (FCC) crystalline structure. Suitable materials for the second seed layer include Co, Ni, Fe or their alloys having an FCC crystalline structure. The third seed layer 308 is formed of Ir and is formed between and in direct contact with the second seed layer 306 and the antiferromagnetic material layer 222. The ABS widths of cap 214 and free layer 210 are set to be equivalent with track width. The width of the magnetic seed layer 306 is much wider than the width of the free layer 210, so that magnetic seed 306 works as a magnetic shield just like the bottom magnetic shield layer 204. An example of the various layers of the sensor 302 is described below. The first seed layer 304 can be Ta and can have a thickness of about 15 Angstrom (A). The second seed layer 306 can be Ni-15at % Fe and can have a thickness of about 300 (A). The third seed layer 308 can be Ir and can have a thickness of about 20 (A). The antiferromagnetic material layer 222 can be an Ir—Mn alloy having a thickness of about 55 (A). The first magnetic layer 216 can be a Co—Fe alloy having a thickness of about 25 (A). The non-magnetic anti-parallel coupling layer 220 can be Ru having a thickness of about 4.2 (A). The second magnetic layer 218 can include: a Co—Fe alloy layer having a thickness of about 5 (A); a Co—Fe—B—Ta alloy layer having a thickness of about 5 (A); a Co—Fe—B alloy layer having a thickness of about 10 (A); and a Co—Fe alloy layer having a thickness of about 5 (A).

Figure 4:
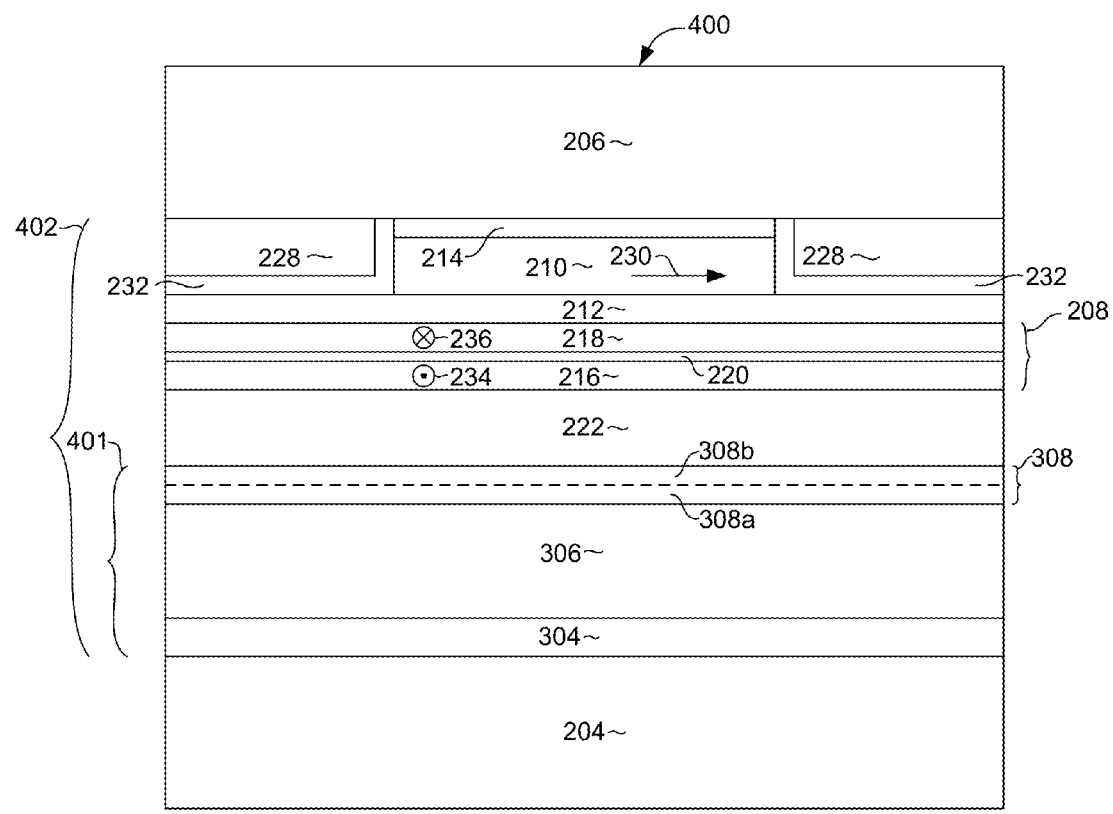
FIG. 4 is a schematic illustration of a magnetic sensor according to another embodiment as seen from the media facing surface.

FIG. 4 shows yet another embodiment having a slightly modified seed layer structure 401. FIG. 4 shows a sensor 400 having a sensor stack 402 that is similar to that of FIG. 3, except that the third seed layer 308 is a bi-layer structure that includes a layer of Ru 308a and a layer of Ir 308b formed over the layer of Ru 308a, so that the layer of Ir 308b is in direct contact with the antiferromagnetic layer 222. As can be seen in FIGS. 3 and 4, the magnetic second seed layer 306 can be substantially thicker than the other seed layers 304, 308. However, because this layer 306 is magnetic, it functions magnetically as a part of the shield 204 and as such does not contribute to gap thickness. Therefore, the presence of the second seed layer has no negative effect on resolution or linear data density. The third seed layer 308 can include, for example, a Ru layer 308a having a thickness of about 5 (A) and an Ir layer 308b having a thickness of about 15 (A).

Figure 5:
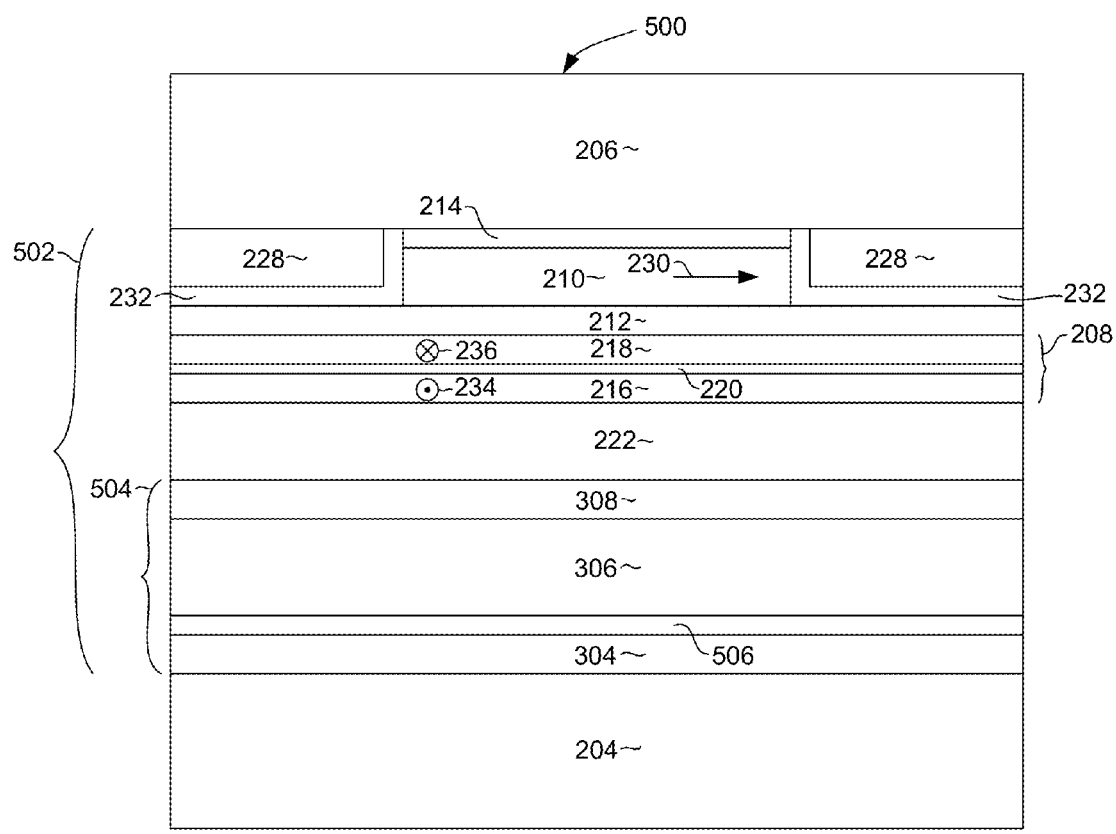
FIG. 5 is a schematic illustration of a magnetic sensor according to another embodiment as seen from the media facing surface.

FIG. 5 illustrates a magnetic sensor 500 according to yet another possible embodiment. This sensor 500 includes a sensor stack 502 having a further modified seed layer structure 504. This seed layer structure 504 includes: a first seed layer 304; a second seed layer 506 formed over the first seed layer 304; a third seed layer 306 formed over the second seed layer 506; and a fourth seed layer 308 formed over the third seed layer 306. As can be seen, the seed layer structure 504 is similar to the seed layer structure 303 described above with reference to FIG. 3, but with the addition of the seed layer 506 between the seed layers 304 and 306. The seed layer 506 can be constructed of a NiFeCr alloy. The presence of this layer 506 enhances grain size of the layers formed above it. As a more specific example, the seed layer 506 can be constructed of $(Ni_{80}Fe_{20})_{60}$—$Cr_{40}$ (at %) and can have a thickness of about 60 (A).

Figure 6:
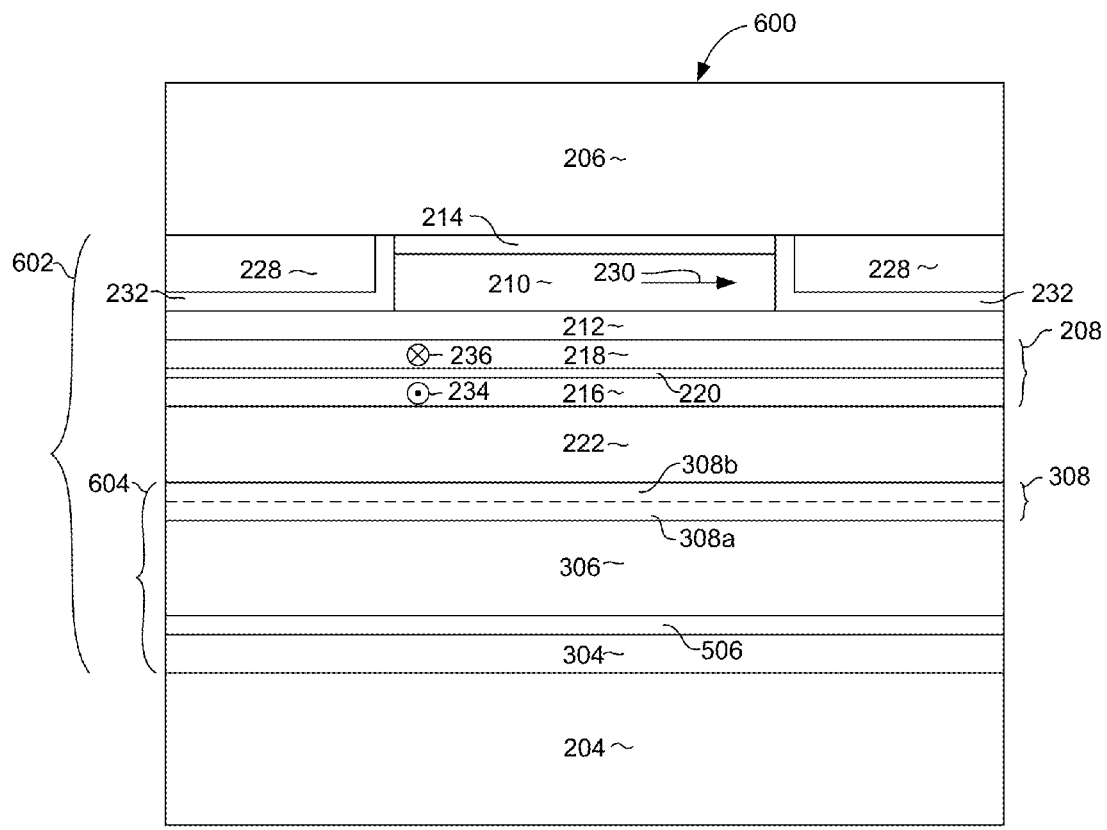
FIG. 6 is a schematic illustration of a magnetic sensor according to another embodiment as seen from the media facing surface.

FIG. 6 illustrates still another possible embodiment that includes a sensor 600 having a sensor stack 602 with a seed layer structure 604. The seed layer structure 604 is similar to the seed layer structure 504 of FIG. 5, except that the fourth seed layer structure 308 is a bi-layer structure including a first sub-layer 308a and a second sub-layer 308b formed over the first sub-layer 308a. In this embodiment, the fourth seed layer structure 308 is similar to the seed layer structure 308 described above with reference to FIG. 4. To that end the first sub-layer 308a can be Ru and the second sub-layer 308b can be Ir.

Having an Ir seed layer directly beneath the AFM layer 222 (FIGS. 2-6), increases the magnetoresistive sensitivity (MR) of the sensor. This increased performance results from improved smoothness of the AFM layer 222. The presence of the Ir seed layer, and the resulting smoothness of the AFM layer 222, also improves the robustness of the pinned layer structure 208 by increasing the mean blocking temperature Tc and by also reducing the low temperature thermal noise component (TbD). Since the pinned layer related thermal fluctuation noise (RTN) is caused by low the temperature component of TbD, the presence of the Ir seed layer effectively suppresses RTN. In addition, the presence of the Ir seed layer reduces interlayer coupling, resulting in better free layer magnetics and reduced free layer signal noise. As a result of these benefits, a smaller sensor track-width can be realized.

Figure 7:
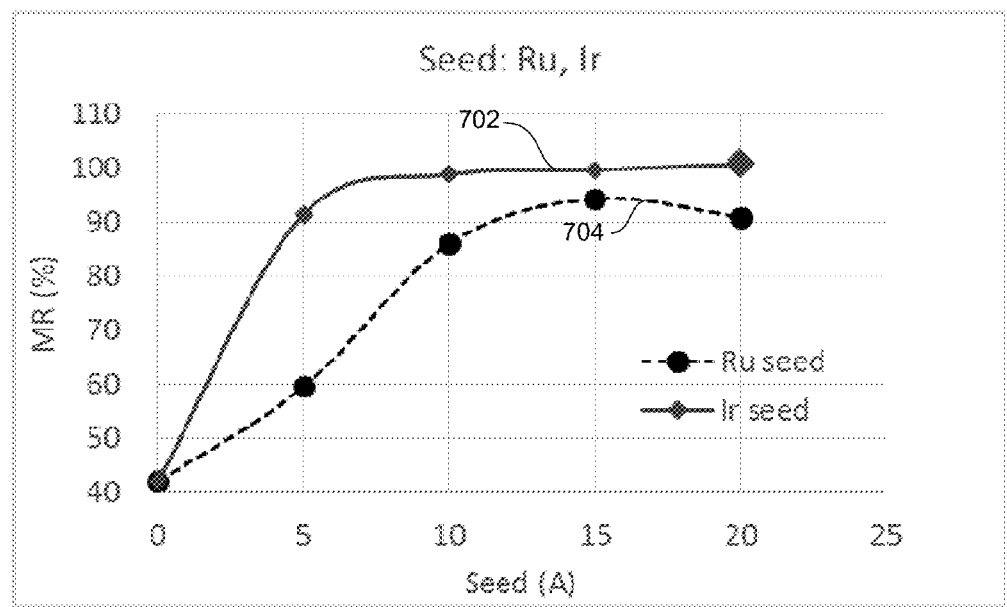
FIG. 7 is a graph illustrating MR response for sensors using Ru and Ir seed layers.

FIGS. 7 through 13 illustrate the performance and robustness benefits provided by the use of an Ir seed layer such as described in the above embodiments. FIG. 7 is a graph illustrating the magnetoresistance performance (dR/R) of a magnetic head as a function of seed layer thickness for an Ir seed layer verses a Ru seed layer. Line 702 shows the MR characteristics for an Ir seed layer for seed layer thicknesses up to 20 Angstroms. Line 704 shows the MR characteristics for a Ru seed layer for seed layer thicknesses up to 20 Angstroms. As can be seen, MR increases and saturates more rapidly with the use of an Ir seed layer than with the use of a Ru seed layer.

Figure 8:
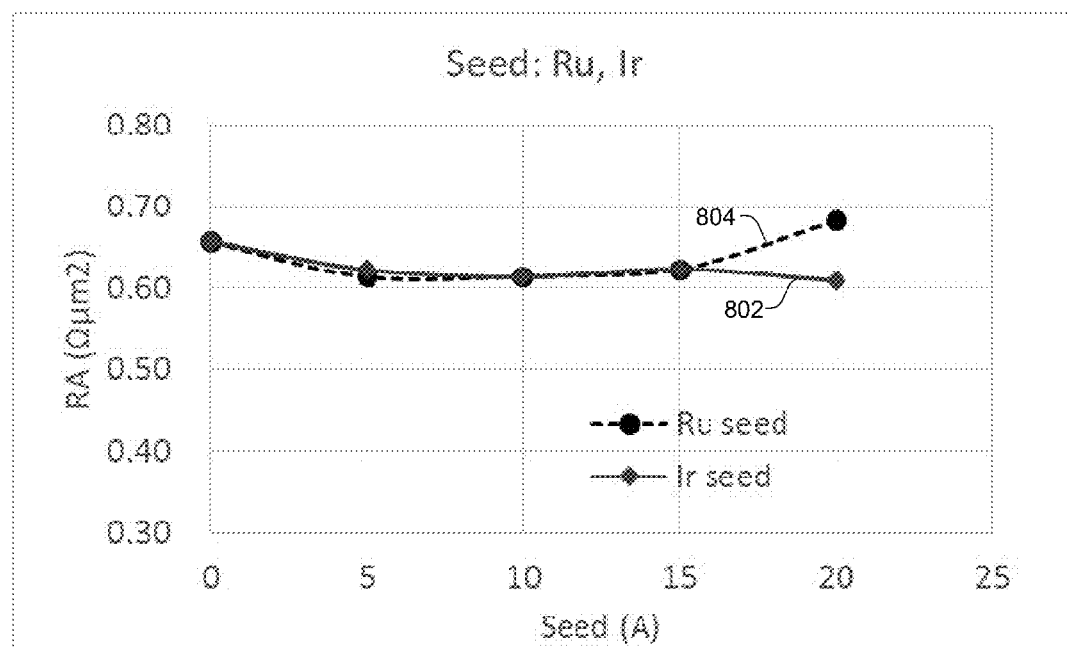
FIG. 8 is a graph illustrating sheet resistance RA of sensors using Ru and Ir seed layers.

FIG. 8 shows the area resistance RA as a function of seed layer thickness for Ir and Ru seed layers. As those skilled in the art will appreciate, a lower area resistance results in increased sensor performance. Line 802 shows the RA for an Ir seed layer and line 804 shows the RA for a Ru seed layer. As can be seen, the RA is similar for both materials.

Figure 9:
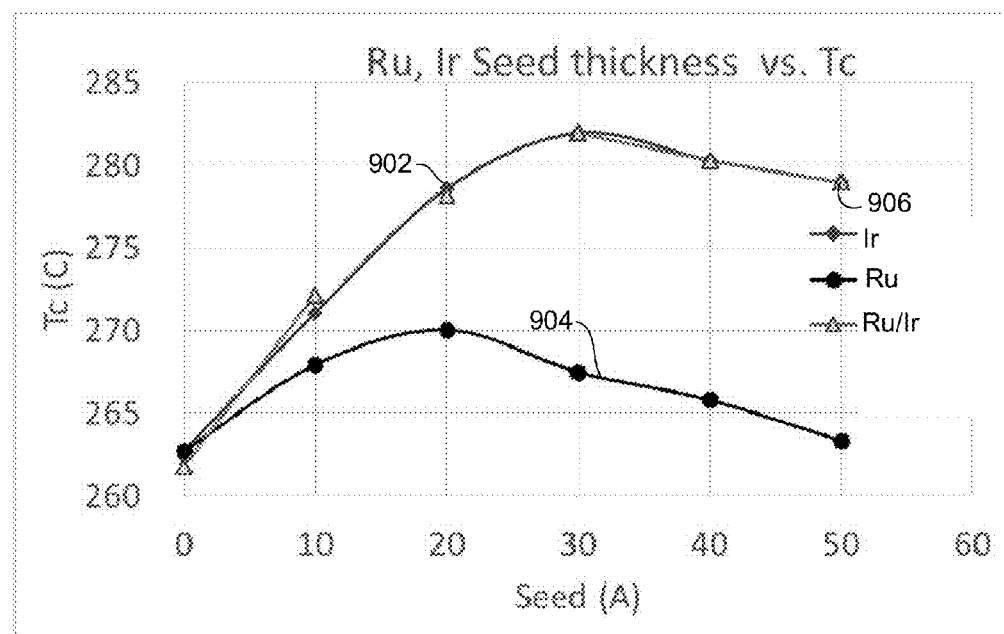
FIG. 9 is a graph illustrating thermal breakdown temperature Tc for sensors using Ru and Ir seed layers.

FIG. 9 is graph showing Tc as a function of seed layer thickness for Ir and Ru seed layers and a combination Ru/Ir seed layer. The magnetic pined layer 208 (FIGS. 2-6) is magnetically coupled with the layer of the antiferromagnetic material 222 (FIGS. 2-6), which is composed of poly-crystals of MnIr alloy. Each MnIr crystal in 222 has its own local blocking temperature. So, the antiferromagnetic material 222 has distributed local blocking temperatures. Tc is the mean blocking temperature of the distributed local blocking temperatures. Therefore, a higher Tc means better pinned layer robustness. Line 902 shows the Tc for an Ir seed layer and includes data points represented as diamonds. Line 904 shows the Tc for a Ru seed layer, and includes data points represented as circles. In addition, line 906 represents Tc for a sensor having a combination Ru/Ir seed layer having a layer of Ru and a layer of Ir formed there-over. This line 906 (which overlaps much of line 902) includes data points represented as hollow triangles. As can be seen, the use of the Ir seed layer (line 902) has Tc very close to that of the combination Ru/Ir seed layer (line 906). As can also be seen, the Tc increases much more rapidly with the use of an Ir seed layer (line 902) or combination Ru/Ir seed layer (line 906) than with the use of a Ru seed layer alone (line 904).

Figure 10:
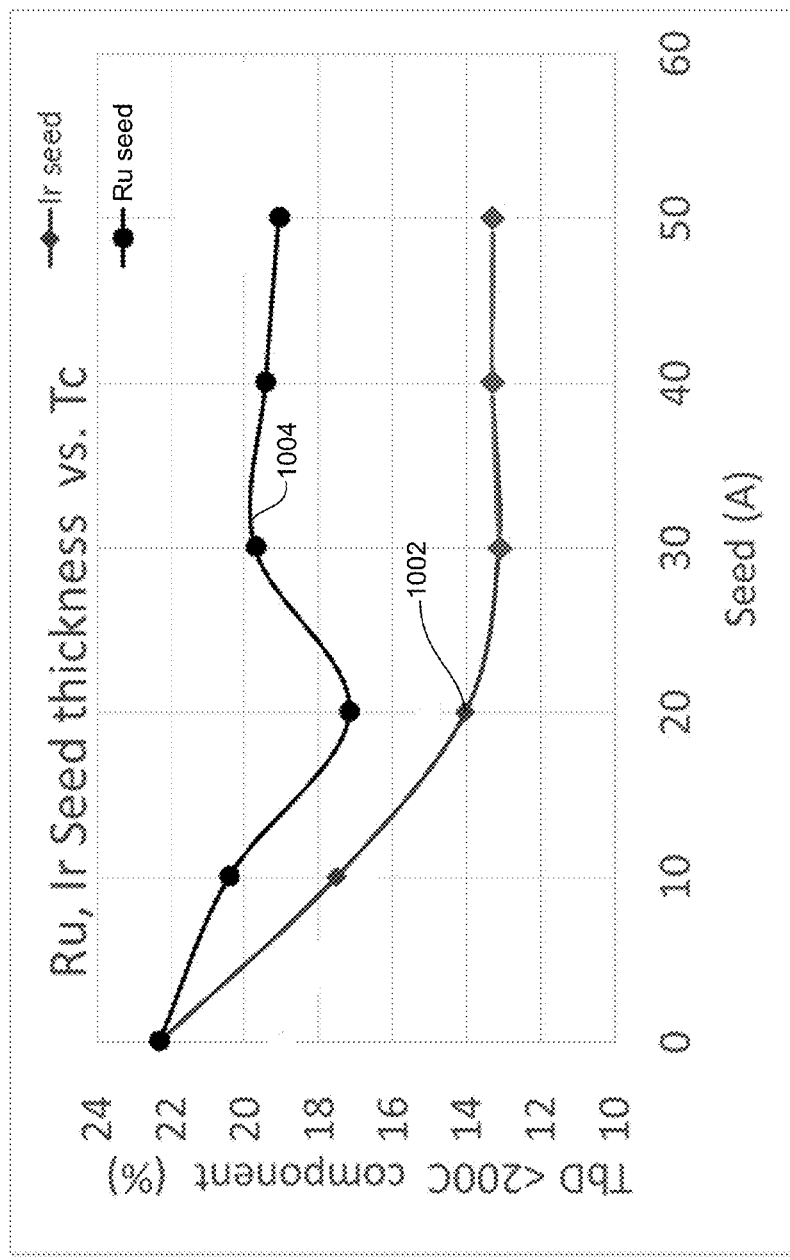
FIG. 10 is a graph illustrating pinned layer oriented low temperature thermal noise component for sensor using Ru and Ir seed layers.

FIG. 10 is a graph illustrating low temperature thermal noise (TbD) as a function of seed layer thickness. Line 1002 shows the TbD for an Ir seed layer and line 1004 shows the TbD for a Ru seed layer. As can be seen, the thermal noise decreases dramatically with use of an Ir seed layer as compared with the use of a Ru seed layer.

Figure 11:
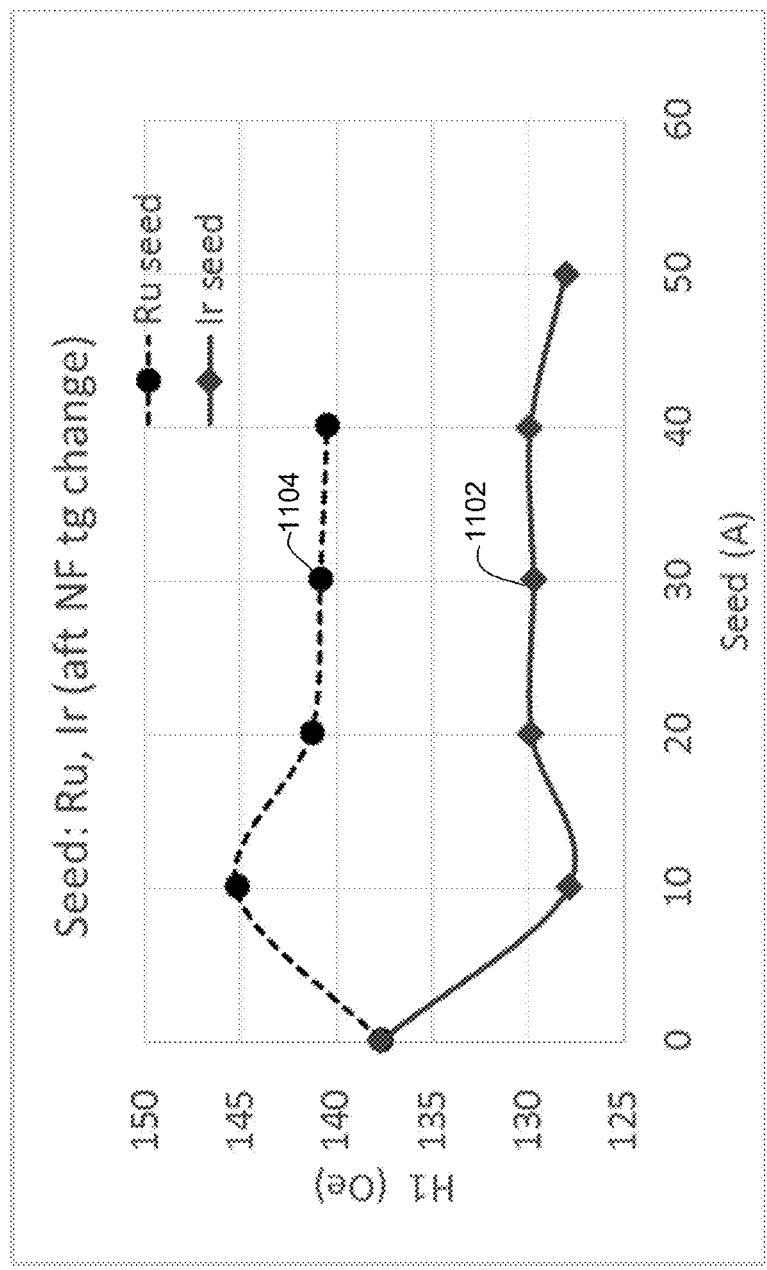
FIG. 11 is a graph illustrating interlayer coupling for sensors having Ru and Ir seed layers.

FIG. 11 shows the relationship between interlayer coupling (H1) and seed layer thickness for Ir and Ru seed layers. The interlayer coupling (H1) is the magnetic coupling between the magnetic layers of the sensor and is generally undesirable in a magnetoresistive sensor. Line 1102 shows the interlayer coupling (H1) using an Ir seed layer and line 1104 shows the interlayer coupling using a Ru seed layer. As can be seen, the interlayer coupling is much lower with the use of an Ir seed layer as compared with a Ru seed layer. This is due to improved smoothness of the layers deposited there-over.

Figure 12:
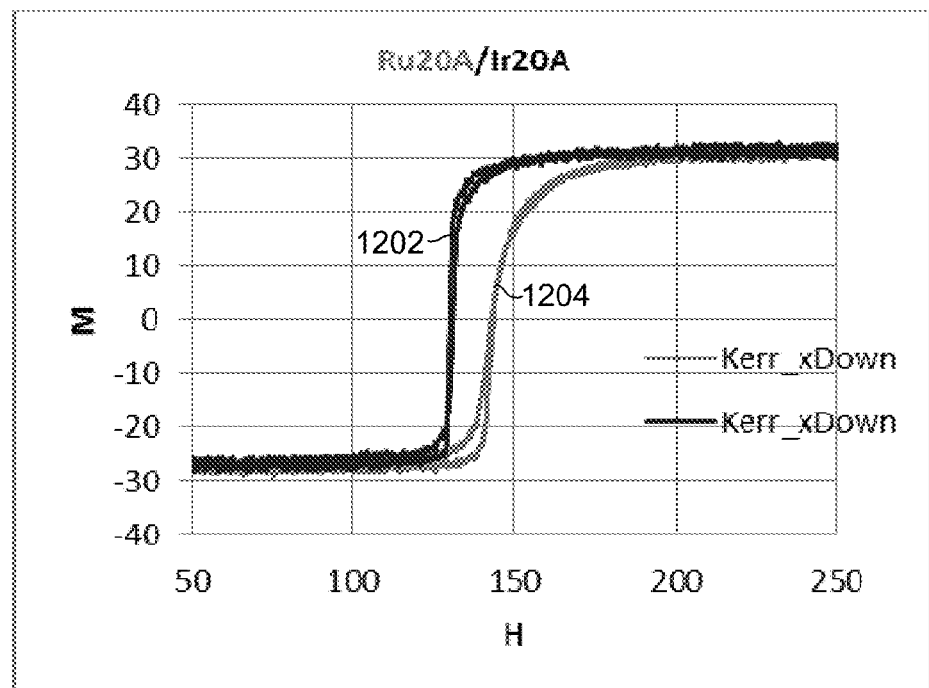
FIG. 12 is a graph illustrating a hysteresis curve for sensors having Ru and Ir seed layers.

FIG. 12 is a graph showing a hysteresis curve for sensors using an Ir versus Ru seed layer. Line 1202 shows the hysteresis curve for a sensor using a 20 Angstrom thick Ir seed layer and line 1204 shows the hysteresis curve for a sensor using a 20 Angstrom thick Ru seed layer. As can be seen, the sensor having the Ir seed layer exhibits much better H1 and improved squareness as compared to the sensor using the Ru seed layer. As a result, the sensor using the Ir seed layer exhibits better free layer magnetic performance than the sensor using the Ru seed layer.

FIG. 13 shows a table illustrating the roughness in nanometers (nm) of various sensor layers when using different seed layer structures. In FIG. 13, rows 1302-1314 show the various layers of the sensor and columns 1316-1320 show how the roughness of the various layers varies depending the type of seed layer used. A lower roughness is desirable for various reasons such as decreasing interlayer coupling, improving barrier layer performance and improving free layer performance. Row 1302 is the substrate, such as a bottom shield. Row 1304 shows roughness of a Ta seed layer. The thickness of the Ta layer is 15 Angstroms, NiFe 300 Angstroms, MnIr 55 Angstroms and CoFe 25 Angtroms. Row 1306 shows the roughness of a NiFe seed layer formed over the Ta seed layer. Rows 1308 and 1310 show the roughness of Ru and Ir seed layers if present in the sensor. Row 1312 shows the roughness of an IrMn AFM layer. Row 1314 shows the roughness of a first CoFe magnetic layer of a pinned layer structure formed over the AFM layer. As can be seen, the roughness of the IrMn and CoFe layers is lowest with the use of an Ir seed layer alone. The roughness increases slightly when using a combination of a Ru seed layer and an Ir seed layer formed over the Ru seed layer, however it is possible that such a combination of Ru and Ir seed layers might be desirable for a possible increase in magnetoresistance signal (MR). The roughness is worse when using no seed layer or when using a Ru seed layer alone without an Ir seed layer.

It can be seen from the above that the use of an Ir seed layer, such as described in various embodiments with reference to FIGS. 2-6, provides many advantages with regard to performance and sensor robustness. FIGS. 7-13 illustrate clearly these significant performance and robustness advantages.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic sensor, comprising:
    a seed layer structure comprising a layer of Ir; and
    a layer of antiferromagnetic material formed on the seed layer, the layer of antiferromagnetic material being in direct contact with the layer of Ir.

2. The magnetic sensor as in claim 1 wherein the layer of antiferromagnetic material comprises IrMn.

3. The magnetic sensor as in claim 1 wherein the seed layer structure further comprises a first seed layer and a second seed layer formed on the first seed layer, the first seed layer comprising an amorphous metal and the second seed layer comprising Ir.

4. The magnetic sensor as in claim 1 wherein the seed layer structure further comprises a first seed layer and a second seed layer formed on the first seed layer, the first seed layer comprising an amorphous metal that includes Co and the second seed layer comprising Ir.

5. The magnetic sensor as in claim 1 wherein the seed layer structure further comprises a first seed layer and a second seed layer formed on the first seed layer, the first seed layer comprising an amorphous metal that includes Ta and the second seed layer comprising Ir.

6. The magnetic sensor as in claim 1 wherein the seed layer structure further comprises a first seed layer and a second seed layer formed on the first seed layer, the first seed layer comprising an amorphous metal and the second seed layer comprising a layer of Ru and a layer of Ir formed on the layer of Ru.

7. The magnetic sensor as in claim 1 wherein the seed layer structure further comprise a magnetic seed layer and a layer including Ir formed over the magnetic seed layer.

8. The magnetic sensor as in claim 7 wherein the magnetic seed layer is a crystalline magnetic layer having a face centered cubic structure.

9. The magnetic sensor as in claim 7 wherein the magnetic seed layer comprises an alloy of one or more of Co, Ni and Fe and has a face centered crystalline structure.

10. The magnetic sensor as in claim 7 wherein the layer including Ir further includes a layer of Ru and a layer of Ir formed over the layer of Ru.

11. A magnetic sensor, comprising:
    a magnetic free layer structure;
    a magnetic pinned layer structure;
    a non-magnetic layer sandwiched between the magnetic pinned layer structure and the magnetic free layer structure;
    a layer of antiferromagnetic material exchange coupled with the magnetic pinned layer structure; and
    a seed layer structure, the seed layer structure comprising a layer of Ir in contact with the layer of antiferromagnetic material.

12. A magnetic data recording system, comprising:
    a housing;
    a magnetic media moveably held within the housing;
    an actuator;
    a slider connected with the actuator for movement adjacent to a surface of the magnetic media; and
    a magnetic sensor formed on the slider, the magnetic sensor further comprising:
    a seed layer structure comprising a layer of Ir; and
    a layer of antiferromagnetic material formed on the seed layer, the layer of antiferromagnetic material being in direct contact with the layer of Ir.

13. The magnetic data recording system as in claim 12 wherein the layer of antiferromagnetic material comprises IrMn.

14. The magnetic data recording system as in claim 12 wherein the seed layer structure further comprises a first seed layer and a second seed layer formed on the first seed layer, the first seed layer comprising an amorphous metal and the second seed layer comprising Ir.

15. The magnetic data recording system as in claim 12 wherein the seed layer structure further comprises a first seed layer and a second seed layer formed on the first seed layer, the first seed layer comprising an amorphous metal that includes Co and the second seed layer comprising Ir.

16. The magnetic data recording system as in claim 12 wherein the seed layer structure further comprises a first seed layer and a second seed layer formed on the first seed layer, the first seed layer comprising an amorphous metal that includes Ta and the second seed layer comprising Ir.

17. The magnetic data recording system as in claim 12 wherein the seed layer structure further comprises a first seed layer and a second seed layer formed on the first seed layer, the first seed layer comprising an amorphous metal and the second seed layer comprising a layer of Ru and a layer of Ir formed on the layer of Ru.

18. The magnetic data recording system as in claim 12 wherein the seed layer structure further comprise a magnetic seed layer and a layer including Ir formed over the magnetic seed layer.

19. The magnetic data recording system as in claim 18 wherein the magnetic seed layer is a crystalline magnetic layer having a face centered cubic structure.

20. The magnetic data recording system as in claim 18 wherein the magnetic seed layer comprises an alloy of one or more of Co, Ni and Fe and has a face centered cubic crystalline structure.

* * * * *